United States Patent [19]

Matsuo

[11] Patent Number: 4,768,109
[45] Date of Patent: Aug. 30, 1988

[54] VIDEO SIGNAL RECORDING AND/OR REPRODUCING APPARATUS

[75] Inventor: Yasutoshi Matsuo, Kawasaki, Japan

[73] Assignee: Victor Company of Japan, Ltd., Yokohama, Japan

[21] Appl. No.: 684,863

[22] Filed: Dec. 21, 1984

[30] Foreign Application Priority Data

Dec. 24, 1983 [JP] Japan .................................. 58-251843
Dec. 24, 1983 [JP] Japan .................................. 58-251844
Dec. 28, 1983 [JP] Japan .................................. 58-247455

[51] Int. Cl.⁴ .............................................. A04N 5/92
[52] U.S. Cl. .................................. 360/33.1; 360/9.1; 360/32; 358/335
[58] Field of Search ................. 360/9.1, 33.1, 34.1, 360/11.1, 32; 358/335, 138, 133, 141

[56] References Cited

U.S. PATENT DOCUMENTS

| 4,068,265 | 1/1978 | Russell | 358/138 |
| 4,292,652 | 9/1981 | Yumde | 358/138 |
| 4,306,249 | 12/1981 | Croll | 358/138 |
| 4,335,393 | 6/1982 | Pearson | 358/11 |
| 4,608,600 | 8/1986 | Sugiyama | 360/9.1 |
| 4,682,250 | 7/1987 | Hirota | 358/335 |

FOREIGN PATENT DOCUMENTS

| 1287611 | 1/1969 | Fed. Rep. of Germany | 360/9.1 |
| 2901034 | 11/1980 | Fed. Rep. of Germany | 360/9.1 |
| 2139848 | 11/1984 | United Kingdom | 360/9.1 |

OTHER PUBLICATIONS

"Extending PCM Video Response Above the Nyquist Limit", by Goldberg, Int'l Broadcasting Convention, 9/20/76.

Primary Examiner—Alan Faber
Attorney, Agent, or Firm—Michael N. Meller

[57] ABSTRACT

A video signal recording apparatus comprises a sampling circuit for sampling an input video signal by a signal having a predetermined frequency $f_s$, a circuit for obtaining a multiplexed signal by multiplexing a reference burst signal to the output sampled signal of the sampling circuit, and a circuit for recording the multiplexed signal on a recording medium. A video signal recording and reproducing apparatus comprises in addition to the constituting elements of the recording apparatus, a circuit for reproducing the recorded multiplexed signal from the recording medium, a circuit for obtaining from the reproduced multiplexed signal first and second reproduced sampled signals having a relative time difference of one horizontal scanning period, a circuit for generating first and second sampling pulses having the same frequency $f_s$ and having phases which mutually differ by 180°, a circuit for re-sampling the first and second reproduced sampled signals by the respective first and second sampling pulses so as to obtain first and second re-sampled signals, and a circuit for at least adding the first and second re-sampled signals so as to obtain a reproduced video signal.

7 Claims, 13 Drawing Sheets

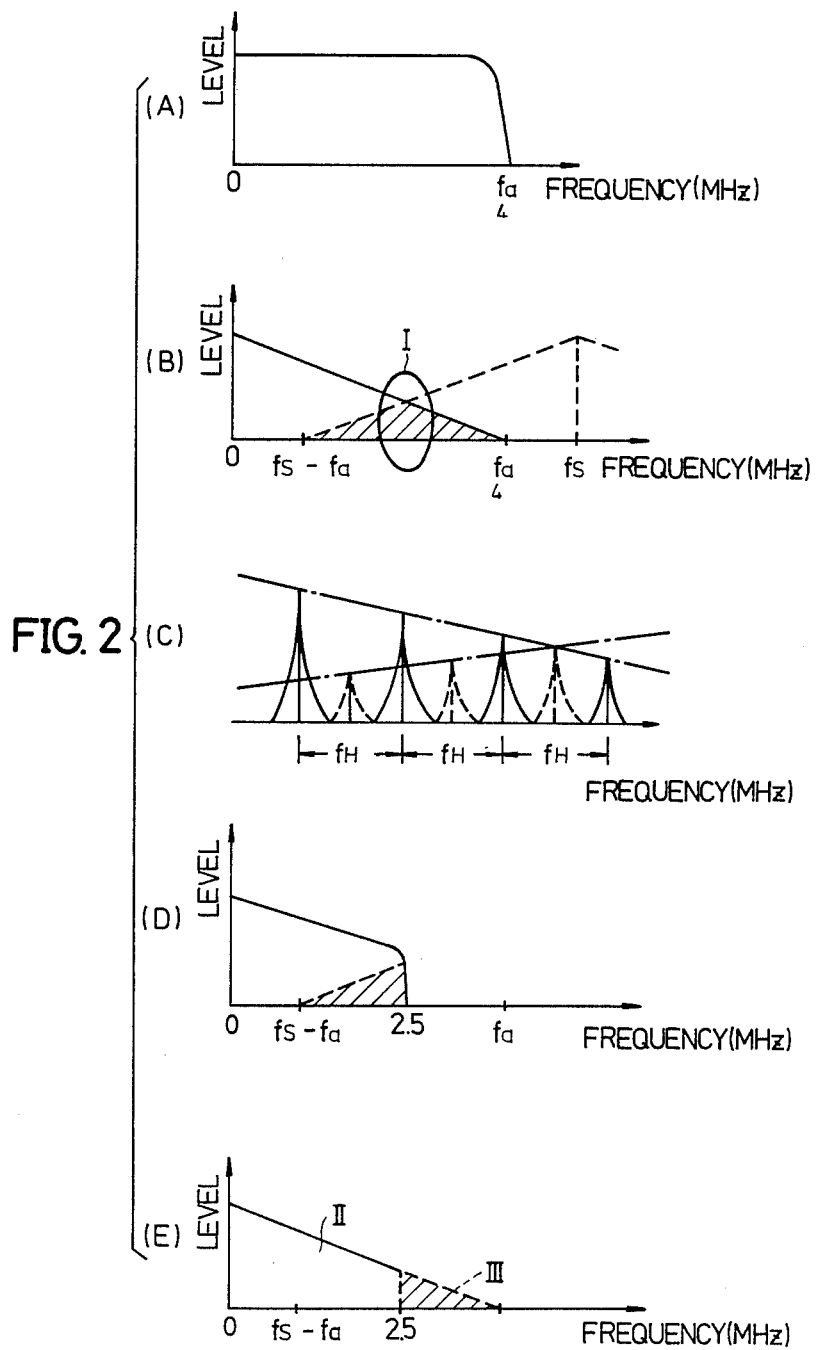

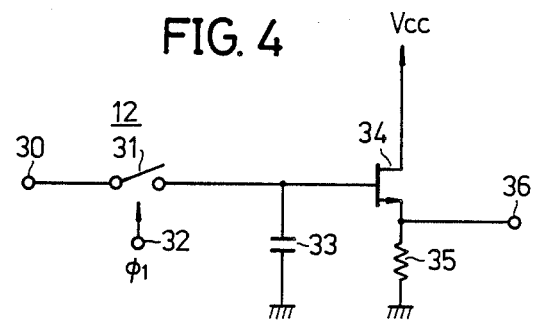
FIG. 4
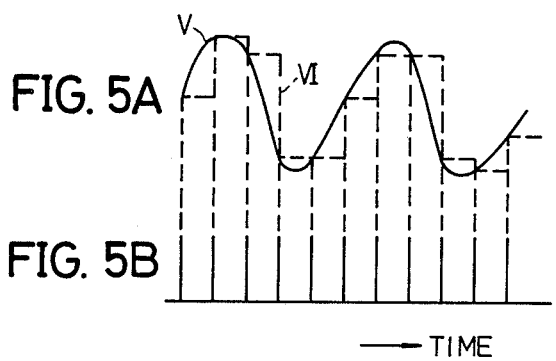
FIG. 5A
FIG. 5B
TIME
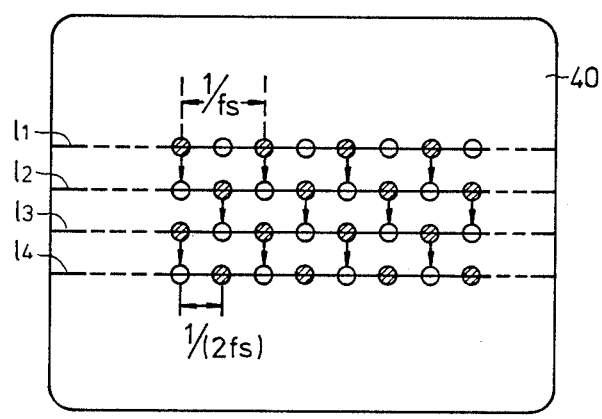
FIG. 6

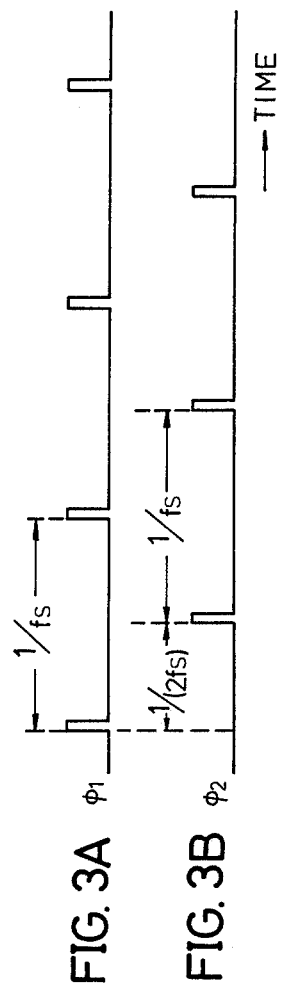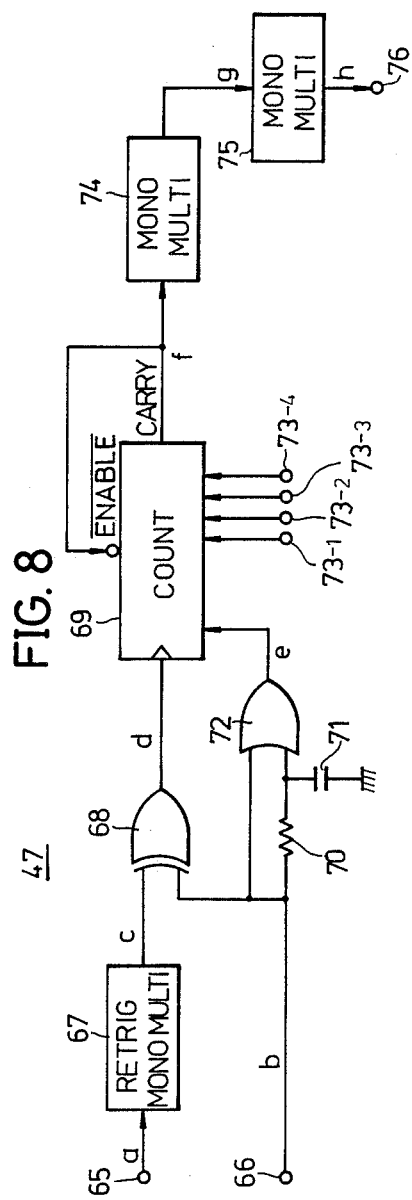

VIDEO SIGNAL RECORDING AND/OR REPRODUCING APPARATUS

BACKGROUND OF THE INVENTION

The present invention generally relates to video signal recording and/or reproducing apparatuses, and more particularly to a video signal recording and/or reproducing apparatus which records at the time of a recording a sampled signal which is obtained by sampling an input video signal such as a luminance signal at a sampling frequency which is slightly higher than an upper limit frequency of a frequency band required by the input video signal, which sampling frequency is an odd number multiple of ½ the horizontal scanning frequency, and reproduces at the time of a reproduction the sample signal and re-samples the reproduced sampled signal by two kinds of pulses which have phases which mutually differ by 180° and have the same frequency as the sampling frequency at the time of the recording so as to obtain two kinds of re-sampled signals and obtain a reproduced video signal having a wide frequency band from these two kinds of re-sampled signals.

Generally, in a helical scan type video tape recorder (hereinafter simply referred to as a VTR), a video signal is recorded on a moving magnetic tape by use of rotary heads at the time of a recording, and the recorded video signal is reproduced from the tape by the rotary heads at the time of a reproduction. The frequency band of the video signal is wide and has an upper limit frequency in the range of 4.2 MHz, for example. In order to frequency-modulate the video signal having the wide frequency band and carry out recording and reproduction with respect to the tape, a relative speed between the head and the tape must be set to a high speed over a predetermined value, as is well known. Further, it is necessary to employ high-performance heads having a high sensitivity in the high-frequency range.

However, in the VTR for home use, the relative speed between the head and the tape is inevitably set to a speed which is considerably lower than the predetermined value, because of the need to keep the cost, the overall size, and the weight of the VTR to a minimum. For this reason, the recording and reproducing frequency band of the VTR is narrower than the original frequency band of the video signal, and it is impossible to obtain a reproduced picture having a high picture quality by recording and reproducing the video signal in the VTR which has the narrow recording and reproducing frequency band.

SUMMARY OF THE INVENTION

Accordingly, it is a generally object of the present invention to provide a novel and useful video signal recording and/or reproducing apparatus in which the problems described heretofore are eliminated.

Another and more specific object of the present invention is to provide a video signal recording and reproducing apparatus which obtains at the time of a recording a sampled signal by sampling an input video signal such as a luminance signal by a sampling pulse having a sampling frequency which is higher than an upper limit frequency of a frequency band required by the input video signal and records a multiplexed signal in which the sample signal and a reference burst signal are multiplexed, which sampling frequency is less than twice the upper limit frequency and is an odd number multiple of ½ the horizontal scanning frequency. At the time of a reproduction, the sampled signal is reproduced and two kinds of reproduced sampled signals having a mutual time difference of one horizontal scanning periods are obtained from the reproduced sampled signal. The two kinds of reproduced sampled signals are independently re-sampled by two kinds of re-sampling pulses which are obtained from a reproduced reference burst signal, which two kinds of re-sampling pulses have phases which mutually differ by 180° and have the same frequency as the sampling frequency at the time of the recording, so as to obtain two kinds of re-sampled signals. A reproduced video signal is obtained by adding the two kinds of re-sampled signals. According to the apparatus of the present invention, it is possible to obtain at the time of the reproduction the re-sampling pulses which are in phase synchronism with the sampling pulse at the time of the recording, compared to a case where a pulse obtained from a phase locked loop (PLL) which is supplied with a horizontal synchronizing signal at the time of the reproduction is used as it is as the re-sampling pulse. Hence, it is possible to display a reproduced picture having sampling points which are located at approximately the same positions as the sampling points at the time of the recording, and the video signal can be reproduced with a satisfactory reproducibility.

Still another object of the present invention is to provide a video signal recording and reproducing apparatus in which the reference burst signal is generated for every predetermined duration which excludes the duration of the horizontal synchronizing signal and is within a vertical blanking period of the input video signal. The reference burst signal is recorded and reproduced in a state multiplexed with the sampled signal. According to the apparatus of the present invention, it is unnecessary to subject the video signal duration to a time base compression or the like as in the case where the reference burst signal is multiplexed within the horizontal blanking period of the input video signal. According to the apparatus of the present invention, the reference burst signal can be multiplexed within the vertical blanking period with ease, and the apparatus can be manufactured at a low cost.

A further object of the present invention is to provide a video signal recording apparatus which obtains the reference burst signal by frequency-dividing the sampling frequency by 1/N, where N is a natural number, and records the reference burst signal. According to the apparatus of the present invention, it is possible to obtain the reference burst signal with ease, and further, it is possible to obtain a reference burst signal having virtually no frequency error.

Another object of the present invention is to provide a video signal reproducing apparatus which reproduces from a recording medium a signal in which the reference burst signal and the sampled signal are multiplexed. A reference sampling pulse which is obtained from a synchronizing signal within the signal reproduced from the recording medium, is delayed in a variable delay circuit. A phase comparison is performed between an output re-sampling pulse of the variable delay circuit and the reproduced reference burst signal, or between the reference sampling pulse and the reproduced reference burst signal, and the delay time of the variable delay circuit is variably controlled depending on a phase error which is obtained as a result of the phase comparison. According to the apparatus of the present invention, a circuit for synchronizing the phase of the sampling pulse with the phase of the re-sampling pulse, can be realized by an analog circuit.

Still another object of the present invention is to provide a recording and reproducing apparatus which records at the time of the recording a signal in which the reference burst signal and the sampled signal. At the time of the reproduction, the phase of a comparison signal which is obtained by frequency-multiplying the reproduced reference burst signal by a predetermined constant, is compared with the phase of a re-sampling pulse which is obtained from a variable frequency oscillator within a phase synchronizing circuit such as a PLL, so as to obtain a phase error voltage. The oscillation frequency of the variable frequency oscillator is variably controlled based on a sampled and held voltage of the phase error voltage. According to the apparatus of the present invention, it is possible to synchronize the phase of the re-sampling pulse with the phase of the sampling pulse at the time of the recording, without the use of a variable delay line or the like which comprises inductors and capacitors. For this reason, it is possible to manufacture the apparatus at a low cost, and the present invention is especially suited for application in a recording and reproducing apparatus for home use.

A further object of the present invention is to provide a video signal reproducing apparatus which comprises a clipping circuit for eliminating an intermediate part of a waveform and passing other parts of the waveform. The clipping circuit is provided in a signal path of a low-frequency signal which is to be mixed to the re-sampled signal and is obtained from a lowpass filter which is provided for the purpose of improving the vertical resolution. According to the apparatus of the present invention, the high-frequency component having a low lever in the output signal of the lowpass filter is blocked. For this reason, it is possible to reduce the aliasing noise which occurs when the cutoff frequency of the lowpass filter is selected to a relatively high frequency. In addition, the pass band of the lowpass filter can be made wide. Moreover, the clipping level of the clipping circuit can be set to a low level. As a result, the vertical resolution will not be deteriorated in the low-frequency range wherein a satisfactory vertical resolution is essential. Further, since the lowpass filter can be designed with a reasonable degree of freedom, it is easy to design the lowpass filter.

Other objects and further features of the present invention will be apparent from the following detailed description when read in conjunctions with the accompanying drawings.

BRIEF DESCRIPTION OF THE DRAWINGS

FIGS. 2(A) through 2(E) show frequency spectrums of signals at various parts of the block system shown in FIG. 1;

FIGS. 3A and 3B respectively show waveforms of sampling pulses;

FIG. 4 is a circuit diagram showing an example of a sampler;

FIGS. 5A and 5B respectively show signal waveforms for explaining the operation of the circuit shown in FIG. 4;

FIG. 6 is a diagram for explaining the operating principle of the apparatus according to the present invention;

FIG. 8 is a systematic circuit diagram showing an embodiment of a timing circuit in the circuit system shown in FIG. 7;

DETAILED DESCRIPTION

Figure 1:
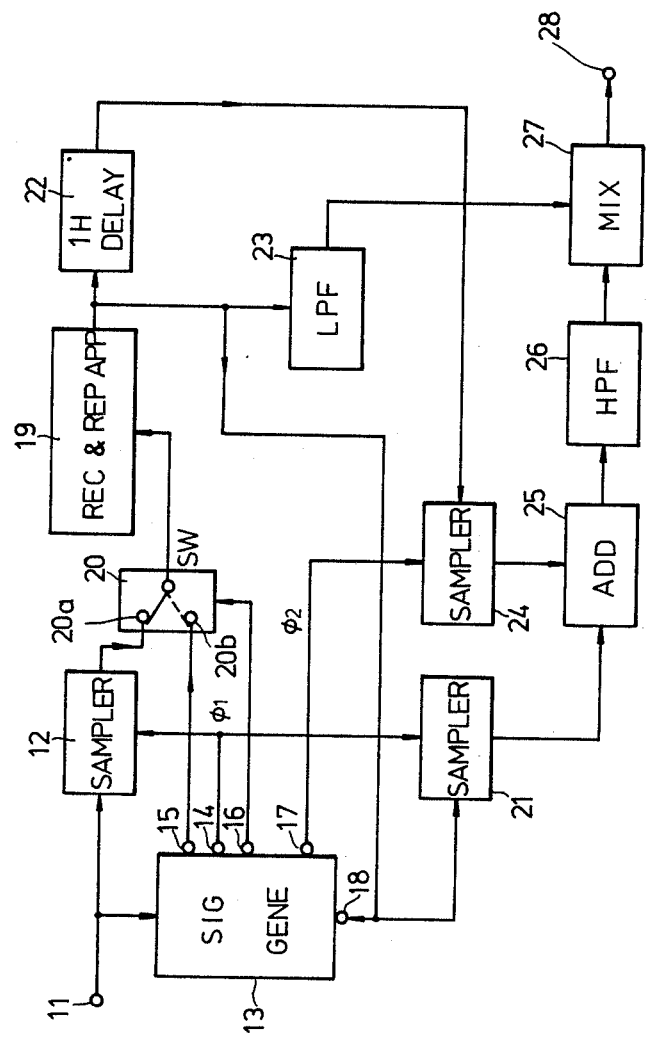
FIG. 1 is a systematic block diagram showing a first embodiment of the apparatus according to the present invention.

In FIG. 1, an input video signal which is to be recorded is applied to an input terminal 11. The input video signal comprises frequency component which are integer multiples of the horizontal scanning frequency $f_H$, and is a luminance signal, for example. As shown in FIG. 2(A), the input video signal (luminance signal) has a wide frequency band with an upper limit frequency $f_a$ which is approximately equal to 4 MHz. The input video signal is supplied to a sampler 12 and to a signal generator 13. The signal generator 13 constitutes an essential part of the present invention, and the signal generator 13 will be described later on in the specification. The sampler 12 samples and holds the input video signal by a sampling pulse $\phi_1$ which is obtained from a terminal 14 of the signal generator 13. The sampling pulse $\phi_1$ has a repetition frequency $f_s$. Thus, a sampled signal which is obtained by sampling the input video signal by the sampling pulse $\phi_1$ having the repetition frequency $f_s$, is obtained from the sampler 12.

The sampling pulse $\phi_1$ is a pulse shown in FIG. 3A which is in phase synchronism with the horizontal synchronizing signal of the input video signal and had the repetition frequency $f_s$ described by the following equation (1), where n is a natural number and $f_H$ represents the horizontal scanning frequency.

$$f_s \approx (\tfrac{1}{2}) \cdot (2n+1) \cdot f_H \qquad (1)$$

The sampling pulse $\phi_1$ has the same repetition frequency $f_s$ as a sampling pulse $\phi_2$ shown in FIG. 3B which will be described later on in the specification, but the phases of the sampling pulses $\phi_1$ and $\phi_2$ mutually differ by 180°. By noting that the recording and reproducing frequency band of a recording and reproducing apparatus 19 which will be described later is narrow, the repetition frequency $f_s$ is selected to a frequency which is less that twice the upper limit frequency $f_a$ of the input video signal and is higher than the upper limit frequency $f_a$. For example, the repetition frequency $f_s$ is selected to 5.011 MHZ in a case where n is equal to 318 and the horizontal scanning frequency $f_H$ is equal to 15.734 kHZ.

Accordingly, in the sampler 12, the input video signal is sampled (sampled and held) by the sampling pulse $\phi_1$ having the repetition frequency $f_s$ which is described by the equation (1) and is less than twice the upper limit frequency $f_a$ of the input video signal. Hence, the frequency spectrum of the output sampled signal of the sample 12 becomes as shown in FIG. 2(B). In FIG. 2(B), aliasing components are included within a frequency band indicated by hatchings between the upper limit frequency $f_a$ and a frequency $f_s - f_a$, where $f_s - f_a$ is a frequency difference between the sampling frequency $f_s$ and the upper limit frequency $f_a$. A part I of the frequency spectrum encircled by an oval mark in FIG. 2(B), is shown in an enlarged scale in FIG. 2(C). The frequency spectrums of the aliasing components indicated by phantom lines in FIG. 2(C), are inserted within respective gap parts between the frequency spectrums of the video signal indicated by solid lines, which frequency spectrums of the video signal are arranged at intervals of $f_H$ which is the horizontal scanning frequency. In other words, the frequency spectrums of the aliasing components and the frequency spectrums of the video signal are in a frequency interleaving relationship. Thus, the aliasing components are band share multiplexed with the input video signal.

The sampler 12 is a sample and hold circuit having the known construction shown in FIG. 4. In FIG. 4, a video signal indicated by a solid line V in FIG. 5A, is applied to an input terminal 30 and is applied to an analog switching element 31 such as a transistor. The switching element 31 is turned ON only while the sampling pulse $\phi_1$ shown in FIG. 5B is applied thereto from a terminal 32. When the switching element 31 is ON, the input video signal is passed as it is through the switching element 31 and is applied to a holding capacitor 33 so as to charge the capacitor 33. The switching element 31 is turned OFF while the sampling pulse $\phi_1$ is not applied thereto, that is, during the low-level period of the sampling pulse $\phi_1$. A field effect transistor (FET) 34 which is coupled to the capacitor 33, has a high input impedance. Hence, the electrical charge in the capacitor 33 is held while the switching element 31 is OFF. Consequently, a sampled signal indicated by a phantom line VI in FIG. 5A is obtained from a connection point between a source of the FET 34 and a resistor 35, and this sample signal is applied to a terminal 20a of a switching circuit 20 shown in FIG. 1 through an output terminal 36.

On the other hand, the signal generator 13 obtains a continuous signal having a single frequency by frequency-multiplying L/M to a signal which has the same frequency as the sampling frequency $f_s$, where L is a natural number less than or equal to M which is also a natural number and L is normally equal to one. This continuous signal produced from a terminal 15 of the signal generator 13 and is appled to a terminal 20b of the switching circuit 20. A switching pulse is produced from a terminal 16 of the signal generator 13, and is applied to the switching circuit 20 so as to control the switching of the switching circuit 20. Consequently, the switching circuit 20 is switched and connected to the terminal 20b for every one or a plurality of predetermined durations within the vertical blanking period of the input video signal excluding the duration of the horizontal synchronizing signal, so as to selectively pass the continuous signal as a reference burst signal. During other durations, the switching circuit 20 is switched and connected to the terminal 20a, so as to selectively pass the sampled signal.

Accordingly, a time division multiplexed signal is obtained from the switching circuit 20. This time division multiplexed signal is made up of the sampled signal of the input video signal and the reference burst signal which is only during durations corresponding to the predetermined durations of the sampled signal. The time division multiplexed signal is supplied to a known recording system of the recording and reproducing apparatus 19. In the recording system, the time division multiplexed signal is frequency-modulated, for example, and is then recorded on a magnetic tape (not shown) by rotary heads (not shown). In a known reproducing system of the recording and reproducing apparatus 19, the recorded signal is reproduced from the magnetic tape by the rotary heads, and is obtained through a frequency demodulator (not shown). It will be assumed that the recording and reproducing frequency band of the recording and reproducing apparatus 19 is narrow such as the recording and reproducing frequency band of the VTR for home use, and is in the range of 2.5 MHz which is considerably narrow compared to the frequency band of the input video signal. Hence, a reproduced time division multiplexed signal comprising the reproduced sampled signal and the reference burst signal is obtained from a reproduced signal output terminal of the recording and reproducing apparatus 19, and the aliasing components are band share multiplexed to the reproduced time division multiplexed signal in a video signal band which exists between a frequency $f_s - f_a$ and an upper limit frequency which is in the range of 2.5 MHz as indicated by hatchings in FIG. 2(D).

The reproduced time division multiplexed signal comprising the reproduced sampled signal and the reference burst signal, is supplied to a terminal 18 of the signal generator 13 shown in FIG. 1. On the other hand, the reproduced time division multiplexed signal is also supplied to a 1H delay circuit 22 and to a lowpass filter 23. The reproduced time division multiplexed signal is delayed by 1H in the 1H delay circuit 22, where H represents one horizontal scanning period, and the delayed reproduced time division multiplexed signal is supplied to a sampler 24. A sampler 21 samples and holds the reproduced time division multiplexed signal by the sampling pulse $\phi_1$ from the terminal 14 of the signal generator 13, which sampling pulse $\phi_1$ has the repetition frequency $f_s$ and is in phase synchronism with the reproduced horizontal synchronizing signal. The sample 24 samples and holds the delayed produced time division multiplexed signal by the sampling pulse $\phi_2$ from a terminal 17 of the signal generator 13, which sampling pulse $\phi_2$ has the repetition frequency $f_s$ and is in phase synchronism with the reproduced horizontal synchronizing signal. In the signal generator 13, the reproduced reference burst signal is separated from the reproduced time division multiplexed signal and is frequency-multiplied by M/L so as to obtain a signal having the sampling frequency $f_s$, as will be described later on in the specification. The phase of the sampling pulse $\phi_1$ or $\phi_2$ is compared with the phase of the above signal having the sampling frequency $f_s$, and the sampling pulse $\phi_1$ or $\phi_2$ is obtained from a variable delay circuit which is controlled of its delay time responsive to the phase error. The other sampling pulse $\phi_1$ or $\phi_1$ is obtained by shifting the phase of the sampling pulse $\phi_1$ or $\phi_2$, for example. As shown in FIGS. 3A and 3B, the phases of the sampling pulses $\phi_1$ or $\phi_2$ mutually differ by 180°. Accordingly, reproduced time division multiplexed signal are alternately sampled (sampled and held) in the samplers 21 and 24 at the sampling frequency $f_s$. Output re-sampled signals of the samplers 21 and 24 are supplied to an adder 25 and are added. Thus, a reproduced video signal (re-sampled signal) which is as if it were sampled at a sampling frequency $2f_s$, obtained from the adder 25.

A more detailed description will now be given on the above. When displaying the reproduced sampled signal in the output reproduced time division multiplexed signal of the recording and reproducing apparatus 19, the information of a certain number of sampling points is displayed time-sequentially in one scanning line, which certain number is a natural number approximately equal to the value obtained by dividing the sampling frequency $f_s$ by the horizontal scanning frequency $f_H$. However, the sampling frequency $f_s$ is selected to an odd number multiple of ½ the horizontal scanning frequency $f_H$ as described before in conjunction with the equation (1). Hence, the number of sampling points is equal to a value which is obtained by adding 0.5 to a natural number. For example, in the case where the sampling frequency $f_s$ is equal to 5.001 MHz, the number of sampling points in one scanning line becomes equal to 318.5. For this reason, in the reproduced picture of the same field, the information of 318 sampling points are displayed in one scanning line, for example, and the information of 319 sampling points is displayed in a next scanning line. In other words, between two adjacent scanning lines, the information of the sampling points is displayed at positions mutually differing by a time interval of approximately $1/(2f_s)$ in the horizontal scanning direction.

FIG. 6 shows a reproduced picture 40 of a field, and four arbitrary scanning lines are represented by $l_1, l_2, l_3$, and $l_4$. The information of the sampling points (only a part of the sampling points are shown in FIG. 6) of the reproduced sampled signal in the reproduced time division multiplexed signal which is supplied to the 1H delay circuit 22, is arranged and displayed in each of the scanning lines at positions indicated by circular marks with hatchings. Between two adjacent scanning lines, the information of these sampling points is displayed at positions mutually differing by a time interval of $1/(2f_s)$ in the horizontal scanning direction.

On the other hand, the information of the sampling points of the reproduced sampled signal in the delayed reproduced time division multiplexed signal which is obtained from the 1H delay circuit 22, is arranged and displayed in each of the scanning lines at positions indicated by circular marks without the hatchings. The information of the sampling points of the reproduced sampled signal in the delayed reproduced time division multiplexed signal, corresponds to the information of the sampling points indicated by the circular marks with the hatchings which are shifted in the vertical direction by one scanning line as indicated by downwardly pointing arrows in FIG. 6.

The information of the sampling points of the output re-sampled signal of the adder 25, is obtained by re-sampling the input and output reproduced time division multiplexed signals of the 1H delay circuit 22 and then adding the re-sampled signals. Hence, the information of the sampling points of the output re-sampled signal of the adder 25 is displayed in the scanning lines $l_1$ through $l_4$ at the positions indicated by the circular marks with the hatchings and at the positions indicated by the circular marks without the hatchings. In other words, a signal which is obtained by essentially sampling the reproduced sampled signal at a frequency which is twice the sampling frequency $f_s$, is displayed in the reproduced picutre 40. Accordingly, the frequency spectrum of the reproduced video signal (re-sampled signal) which is obtained from the adder 25 becomes as shown in FIG. 2(E). The frequency spectrum shown in FIG. 2(E) is made up of a frequency spectrum II of the original video signal existing under the frequency of 2.5 MHz and a frequency spectrum III of the aliasing components existing over the frequency of 2.5 MHz. As a result, it is possible to obtain from the adder 25 a reproduced video signal having a frequency band which is wider than the recording and reproducing frequency band of the recording and reproducing apparatus 19. The output reproduced video signal of the adder 25 is passed through a highpass filter 26 as shown in FIG. 1, and only the high-frequency component over the frequency $f_s - f_a$, for example, is frequency-selected and obtained from the highpass filter 26. The output high-frequency component of the highpass filter 26 is supplied to a mixing circuit 27.

On the other hand, the reproduced time division signal obtained from the recording and reproducing apparatus 19 is supplied to the lowpass filter 23 shown in FIG. 1, and only the low-frequency component under the frequency $f_s - f_a$, for example, is frequency-selected and obtained from the lowpass filter 23. The output low-frequency component of the lowpass filter 23 is supplied to the mixing circuit 27. The vertical resolution is deteriorated in the output reproduced video signal of the adder 25, and thus, this is the reason why the low-frequency component which determines the vertical resolution is eliminated in the highpass filter 26. On the other hand, the low-frequency component within the reproduced time division multiplexed signal which is not yet sampled in the samplers 21 and 24, is obtained in the lowpass filter 23 so as to maintain a satisfactory vertical resolution. The mixing circuit 27 mixes the low-frequency component which is not re-sampled and the high-frequency component which is re-sampled, and produces a reproduced video signal having a wide frequency band. The output reproduced video signal of the mixing circuit 27 is obtained through an output terminal 28.

In a case where the signal generator 13 is designed to obtain the sampling pulses $\phi_1$ and $\phi_2$ from a voltage controlled oscillator (VCO) within a phase locked loop (PPL) by supplying the horizontal synchronizing signal to a phase comparator within the PLL, the phase comparison rate of the PLL is equal to the horizontal scanning frequency $f_H$ and is low. Hence, in this case, it is difficult to stably match the phases of the sampling pulses $\phi_1$ and $\phi_2$ with respect to the video signal between the recording system and the reproducing system. When the phases of the sampling pulses $\phi_1$ and $\phi_2$ cannot be matched with respect to the video signal, the reproduced picture becomes blurred and it is impossible to obtain sharp contours of images in the reproduced picture.

Figure 7:
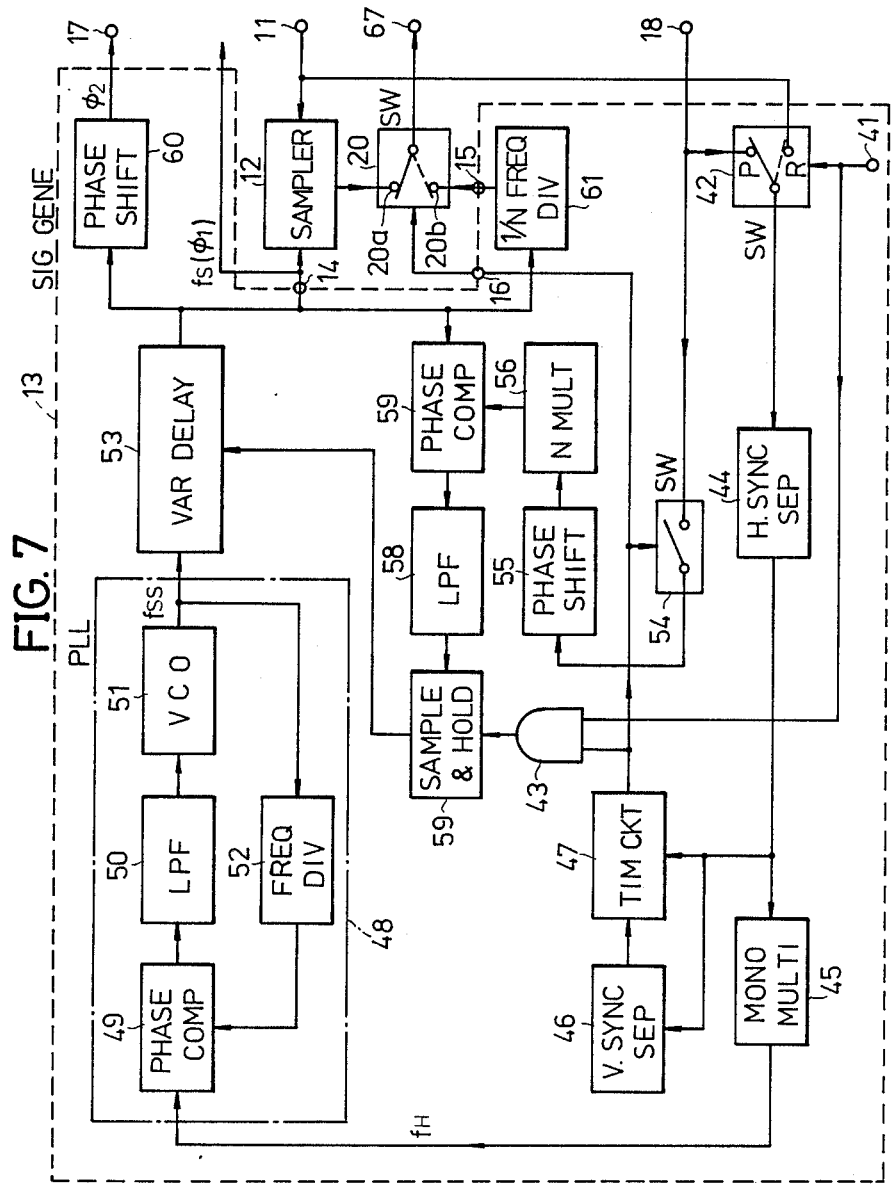
FIG. 7 is a systematic circuit diagram showing a first embodiment of a signal generator in the block system shown in FIG. 1.

Accordingly, the signal generator 13 of the present invention is designed to eliminate the above problem and a description will hereinafter be given with respect to the construction of the signal generator 13 by referring to FIG. 7. In FIG. 7, those parts which are the same as those corresponding parts in FIG. 1 are designated by the same reference numerals.

First, a description will be given with respect to the operation of the signal generator 13 at the time of the recording. At the time of the recording, a low-level recording mode signal, for example, is applied to an input terminal 41 is supplied to a switching circuit 42, and the switching circuit 42 is connected to a terminal R. On the other hand, the low-level recording mode signal is also supplied to one input terminal of a 2-input AND circuit 43 and closes the gate of the AND circuit 43. As a result, the video signal which is to be recorded and is applied to the input terminal 11, is passed through the switching circuit 42 and is supplied to a horizontal synchronizing signal separating circuit 44 wherein the horizontal synchronizing signal is separated. The output signal of the separating circuit 44 is supplied to a monostable multivibrator 45, a vertical synchronizing signal separating circuit 46, and a timing circuit 47.

The horizontal synchronizing signal which is eliminated of the equalizing pulse in the monostable multivibrator 45, is supplied to a phase comparator 49 within a phase locked loop (PLL) 48. The PLL 48 has a closed loop construction and comprises the phase comparator 49, a lowpass filter 50, a voltage controlled oscillator (VCO) 51, and a frequency divider 52. The frequency divider 52 is designed to frequency-divide an output signal of the VCO 51 by $2/(2n+1)$ and supply to the phase comparator 49 a signal having the horizontal scanning frequency $f_H$. Hence, as is well known, a signal which has a frequency of $(\frac{1}{2})\cdot(2n+1)\cdot f_H$ and is in phase synchronism with the horizontal synchronizing signal, is obtained from the VOC 51. As may be understood from the equation (1) described before, the signal obtained from the VCO 51 has the sampling frequency $f_s$ which is equal to 5.001 MHz, for example. The output signal of the VCO 51 is supplied to a variable delay circuit 53 as a reference sampling pulse $f_{ss}$. The variable delay circuit 53 is variable delay line comprising inductors and capacitors, for example, and is variably controlled of its delay time in an analog manner. The variable delay circuit 53 is set to provide a delay time which is $\frac{1}{2}$ the maximum obtainable delay time when a control signal applied thereto is zero.

On the other hand, the timing circuit 47 is supplied with the horizontal synchronizing signal from the separating circuit 44 and the vetical synchronizing signal from the separating circuit 46. The timing circuit 47 generates a gate pulse which assumes a low level, in synchronism with one or a plurality of predetermined durations within the vertical blanking period of the input video signal excluding the duration of the horizontal synchronizing signal. For example, in the present embodiment, the timing circuit 47 generates the gate pulse in the last 1H of the vertical blanking period. Accordingly, in a case where the input video signal has 525 scanning lines, the gate pulse is generated in the twenty-first H (scannning line number 21) and in the 284-th H (scanning line number 284).

FIG. 8 is a systematic circuit diagram showing the timing circuit 47. In FIG. 8, a signal a shown in FIG. 9(A) comprising the horizontal synchronizing signal and an equalizing pulse, which is obtained from the separating circuit 44, is applied to an input terminal 65. A vertical synchronizing signal b shown in FIG. 9(B) obtained from the separating circuit 46, is applied to an input terminal 66. A re-trigger type monostable multivibrator 67 is triggered by a rise in the signal a, and returns to a stable state after a predetermined time only when a trigger pulse of the signal a is not applied to the re-trigger type monostable multivibrator 67 during this predetermined time which is shorter than one horizontal scanning period and is longer than $\frac{1}{2}$ the horizontal scanning period. Accordingly, the re-trigger type monostable multivibrator 67 remains in a quasi-stable state while the trigger pulse is applied thereto at intervals of less than the above predetermined time, and the equalizing pulse having the pulse interval which is $\frac{1}{2}$ the horizontal scanning period is eliminated. As a result, only a horizontal synchronizing pulse c shown in FIG. 9(C), excluding the duration of the vertical synchronizing signal, is obtained from the re-trigger type monostable multivibrator 67. The horizontal synchronizing pulse c is supplied to an exclusive-OR circuit 68 which is also supplied with the vertical synchronizing signal b from the input terminal 66, and is converted into a pulse train d shown in FIG. 9(D). The pulse train d is applied to a clock terminal of a counter 69.

Figure 9:
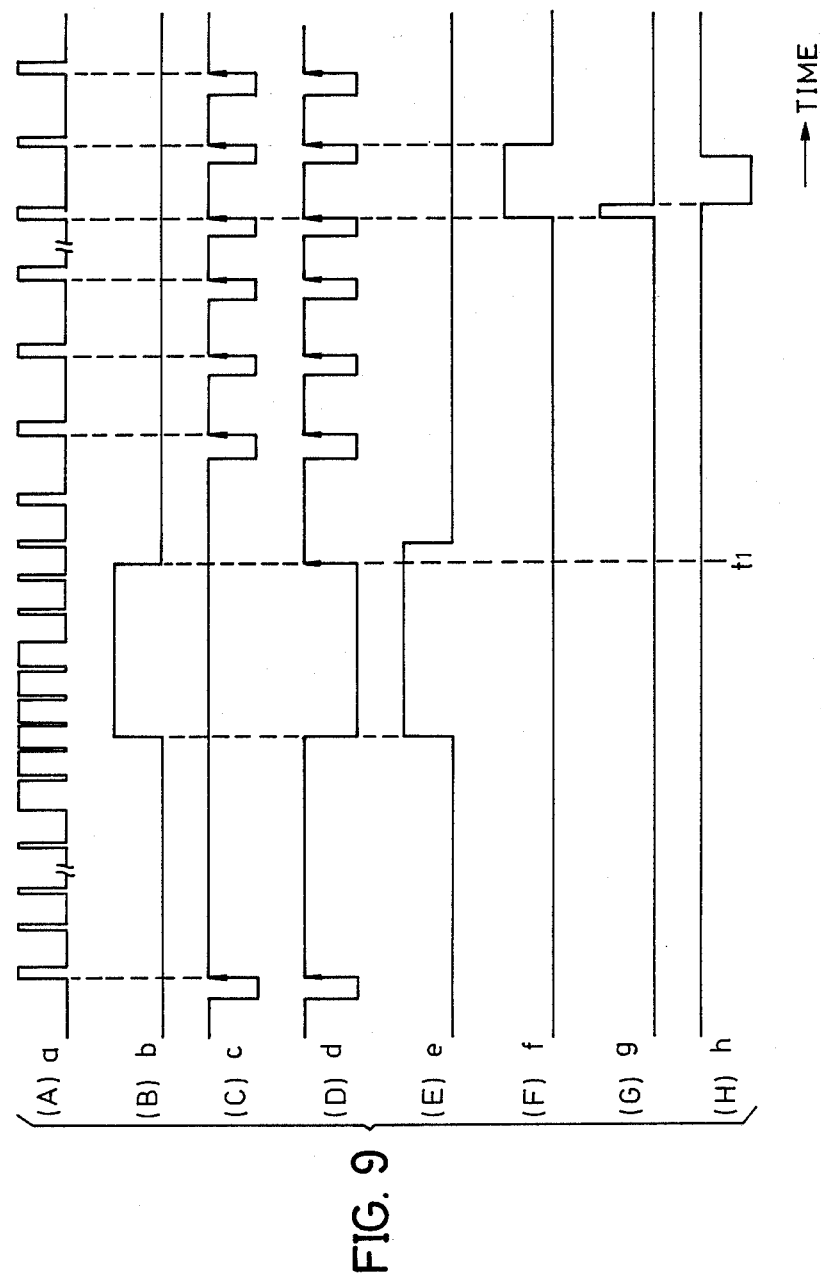
FIGS. 9(A) through 9(H) show signal waveforms for explaining the operation of the circuit system shown in FIG. 8.

On the other hand, the vertical synchronizing signal b is passed through an integrating circuit comprising a resistor 70 and a capacitor 71, and is supplied to one input terminal of a 2-input OR circuit 72. The vertical synchronizing signal b is also supplied directly to the other input terminal of the OR circuit 72. Accordingly, a pulse e shown in FIG. 9(E) is obtained from the OR circuit 72 and is applied to a load terminal of the counter 69. The counter 69 loads a 4-bit preset data obtained from preset terminals 73-1 through 73-4 at a time $t_1$ when the horizontal synchronizing pulse d applied to the clock terminal of the counter 69 first rises after the pulse e applied to the load terminal of the counter 69 assumes a high level. The value of the preset data is selcted to such a value that the counter 69 counts the horizontal synchronizing pulse d and produces a carry signal f shown in FIG. 9(F) in the twenty-first H and in the 284-th H. The carry signal f is applied to an enable terminal of the counter 69, and to a monostable multivibrator 74. The monostable multivibrator 74 is triggered by a rise in the carry signal f. The monostable multivibrator 74 generates a pulse g having a narrow pulse width as shown in FIG. 9(G) when triggered, and this pulse g is supplied to a monostable multivibrator 75. The monostable multivibrator 75 produces a pulse h shown in FIG. 9(H) which assumes a low lever only for a predetermined time from a falling edge of the pulse g. Accordingly, the pulse h produced from the monostable multivibrator 75 assumes the low level only druing arbitrary times within the twenty-first H and the 284-th H. This pulse h is produced through an output terminal 76 as a gate pulse.

Returning now to the description of FIG. 7, the gate pulse h is supplied to the other input terminal of the AND circuit 43. However, as described before, the gate of the AND circuit 43 is closed at the time of the recording, and the output signal of the AND circuit 43 constantly assumes a low level. The gate pulse h is also supplied to the switching circuit 20 and a switching circuit 54 as a switching pulse. Thus, during the low-level period of the gate pulse h, the swtiching circuit 20 is switched and connected to the terminal 20b and the switching circuit 54 is turned ON. On the other hand, during the high-level period of the gate pulse h, the switching circuit 20 is switched and connected to the terminal 20a and the switching circuit 54 is turned OFF. The reproduced video signal from the input terminal 18 is supplied to the switching circuit 54, but the reproduced video signal obviously does not exist at the time of the recording, and there is no output from the switching circuit 54 at the time of the recording. Accordingly, no outputs are obtained from a phase shifter 55 and a N-frequency multiplier 56 which are coupled to the output side of the switching circuit 54. Consequently no signal is supplied to one of two input terminals of a phase comparator 57 does not exist.

The sampling pulse $\phi_1$ which has the repetition frequency $f_s$ and is obtained from the variable delay circuit 53, is supplied to the other input terminal of the phase comparator 57. However, the output signal of the phase comparator 57 is zero since no signal is supplied to the one input terminal of the phase comparator 57. Thus, no signal is supplied to a sample and hold circuit 59 which is coupled to the output side of the phase comparator 57 through a lowpass filter 58. The sample and hold circuit 59 is supplied with a sampling and holding pulse from the AND circuit 43, and is designed to perform a sampling operation during a low-level period of the sampling and holding pulse and perform a holding operation during the high-level period of the sampling and holding pulse. However, the output signal of the AND circuit 43 assumes a low level at the time of the recording, as described before. Hence, the sample and hold circuit 59 is set to constantly perform the sampling operation, however, the output signal of the lowpass filter 58 is zero as described before, and a control signal which is supplied to the variable delay circuit 53 from the sample and hold circuit 59 is also zero.

Accordingly, at the time of the recording, the delay time of the variable delay circuit 53 is fixed to a delay time which is ½ the maximum obtainable delay time. An output pulse of the variable delay circuit 53 is produced through the terminal 14 as the sampling pulse $\phi_1$ having the repetition frequency $f_s$, and is supplied to the sampler 12, the phase comparator 57, a phase shifter 60, and a 1/N-frequency divider 61. The sampling pulse $\phi_2$ which has the same repetition frequency $f_s$ as the sampling pulse $\phi_1$ but has a phase which differs from the phase of the sampling pulse $\phi_1$ by 180°, is obtained from the phase shifter 60 and is produced through the terminal 17.

Figure 10:
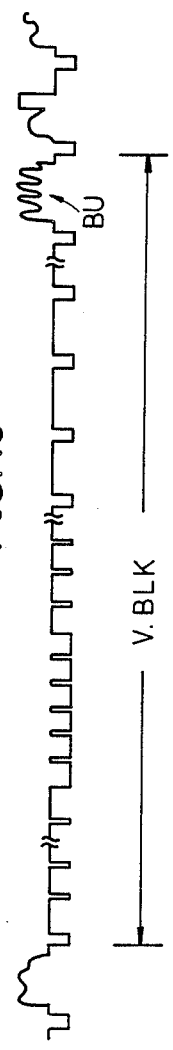
FIG. 10 shows a reference signal which is recorded and reproduced in the apparatus according to the present invention together with a video signal.

The frequency divider 61 frequency-divides the sampling pulse $\phi_1$ by 1/N, where N is a natural number, and supplies to the terminal 20b of the switching circuit 20 a pulse train having a repetition frequency $f_s/N$. The value of N is selected by considering the recording and reproducing frequency band. As described before, at the time of the recording, the switching circuit 20 selectively passes the output sampled signal of the sampler 12 applied to the terminal 20a thereof, and the switching circuit 20 is switched and connected to the terminal 20b only during the twenty-first H and the 284-th H excluding the duration of the horizontal synchronizing signal. For this reason, a signal which is obtained from a common terminal of the switching circuit 20 and is produced through an output terminal 62, is a time division multiplexed signal in which the output signal of the frequency divider 61 is time division multiplexed to the twenty-first H and the 284-th H of the output sampled signal of the sampler 12. In the time division multiplexed signal produced through the output terminal 62, the output signal of the frequency divider 61 which exists in the burst form. This output signal of the frequency divider 61 which exits in the burst form in the time division multiplexed signal, is transmitted as a reference burst signal for controlling the phase of a signal (re-sampling pulse) which has the same frequency as the sampling frequency $f_s$ and is used to perform the re-sampling at the time of the reproduction as will be described later on in the specification. FIG. 10 shows the waveform of the video signal with a reference burst signal BU added within a vertical blanking period V.BLK of the video signal.

Next, a description will be given with respect to the operation of the signal generator 13 at the time of the reproduction. At the time of the reproduction, a high-level reproduction mode signal is applied to the input terminal 41 shown in FIG. 7. Hence, the switching circuit 42 is switched and connected to the a terminal P, and the gate of the AND circuit 43 is opened. The reproduced time division multiplexed signal applied to the input terminal 18 is passed through the switching circuit 42 and the separating circuit 44, and is supplied to the monostable multivibrator 45, the separating circuit 46, and the timing circuit 47. Accordingly, the PLL 48 which is supplied with the output signal of the monostable multivibrator 45, operates similarly as at the time of the recording. In addition, the timing circuit 47 generates a gate pulse which assumes a low level only during the predetermined period within the vertical blanking period of the reproduced time division multiplexed signal, similarly as at the time of the recording. Unlike at the time of the recording, the output gate pulse of the tiing circuit 47 is passed through the AND circuit 43 and is supplied to the sample and hold circuit 59 as a sampling pulse.

Further, by use of the output gate pulse of the timing circuit 47, the switching circuit 54 extracts only the reference burst signal within the reproduced time division multiplexed signal. The extracted reference burst signal from the switching circuit 54 is supplied to the phase shifter 55 to adjust the phase so that an optimum monitoring picture is obtained. The output signal of the phase shifter 55 is supplied to the frequency multiplier 56 which produces a signal having the same frequency as the sampling frequency $f_s$, and the output signal of the frequency multiplier 56 is supplied to the phase comparator 57. The phase comparator 57 compares the phase of the output sampling pulse $\phi_1$ of the variable delay circuit 53 and the phase of the output signal of the frequency multiplier 56, which output signal of the frequency multiplier 56 is in phase synchronism with the reproduced reference burst signal and has the frequency $f_s$. An error voltage which is in accordance with the phase error is obtained from the phase comparator 57, and is supplied to the sample and hold circuit 59 through the lowpass filter 58. The output error voltage of the lowpass filter 58 is a substantially constant D.C. voltage in a latter part of the duration in which the reference burst signal is reproduced. The sample and hold circuit 59 samples this output error voltage of the lowpass filter 58 during the low-level period of the gate pulse (that is, for the duration in which the reference burst signal is reproduced), and holds the sampled value when the duration in which the reference burst signal is reproduced ends until a duration in which a next reference burst signal is reproduced.

The output voltage of the sample and hold circuit 59 is supplied to the variable delay circuit 53 as a control signal, and variably controls the delay time of the variable delay circuit 53 so that the phase error in the phase comparator 57 becomes a minimum. The sampling pulse $\phi_1$ which is obtained from the variable delay circuit 53 is produced through the terminal 14, and is supplied to the sampler 21 shown in FIG. 1 as a re-sampling pulse. Further, the sampling pulse $\phi_2$ which is obtained by passing the output sampling pulse $\phi_1$ of the variable delay circuit 53 to the phase shifter 60, is produced through the terminal 17 and is supplied to the sampler 24 shown in FIG. 1 as a re-sampling pulse. The re-sampling pulse is essentially corrected of the phase thereof because the delay time of the variable delay circuit 53 is controlled according to the phase of the reproduced reference burst signal. For this reason, the drift which is in the order of several tens of nanoseconds and exists in the reference sampling pulse from the PLL 48, can be reduced to an extremely small drift. As a result, it is possible to dislay a reproduced picture having sampling points which are located at approximately the same positions as the sampling points at the time of the recording, and the video signal can be reproduced with a satisfactory reproducibility.

Figure 11:
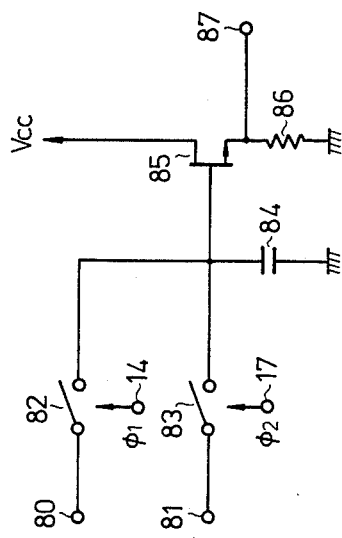
FIG. 11 is a circuit diagram showing an embodiment of an essential part of a reproducing system in the block system shown in FIG. 1.

The samplers 21 and 24 and the adder 25 shown in FIG. 1 may be constructed as shown in FIG. 11. In FIG. 11, the output reproduced time division multiplexed signal of the recording and reproducing apparatus 19 is applied to an input terminal 80, and the output delayed reproduced time division multiplexed signal of the 1H delay circuit 22 is applied to an input terminal 81. These reproduced time division multiplexed signals (reproduced sampled signals) are passed through respective analog switching elements 82 and 83 only during the high-level period of the sampling pulses $\phi_1$ and $\phi_2$ applied to the respective input terminals 14 and 17, and are applied to a holding capacitor 84 so as to charge this capacitor 84. The terminal votlage of the capacitor 84 is applied to a gate of a FET 85 and is subjected to an impedance conversion, and is then obtained through a connection point between a source of the FET 85 and a resistor 86. The signal obtained from this connection point is produced through an output terminal 87.

Figure 12:
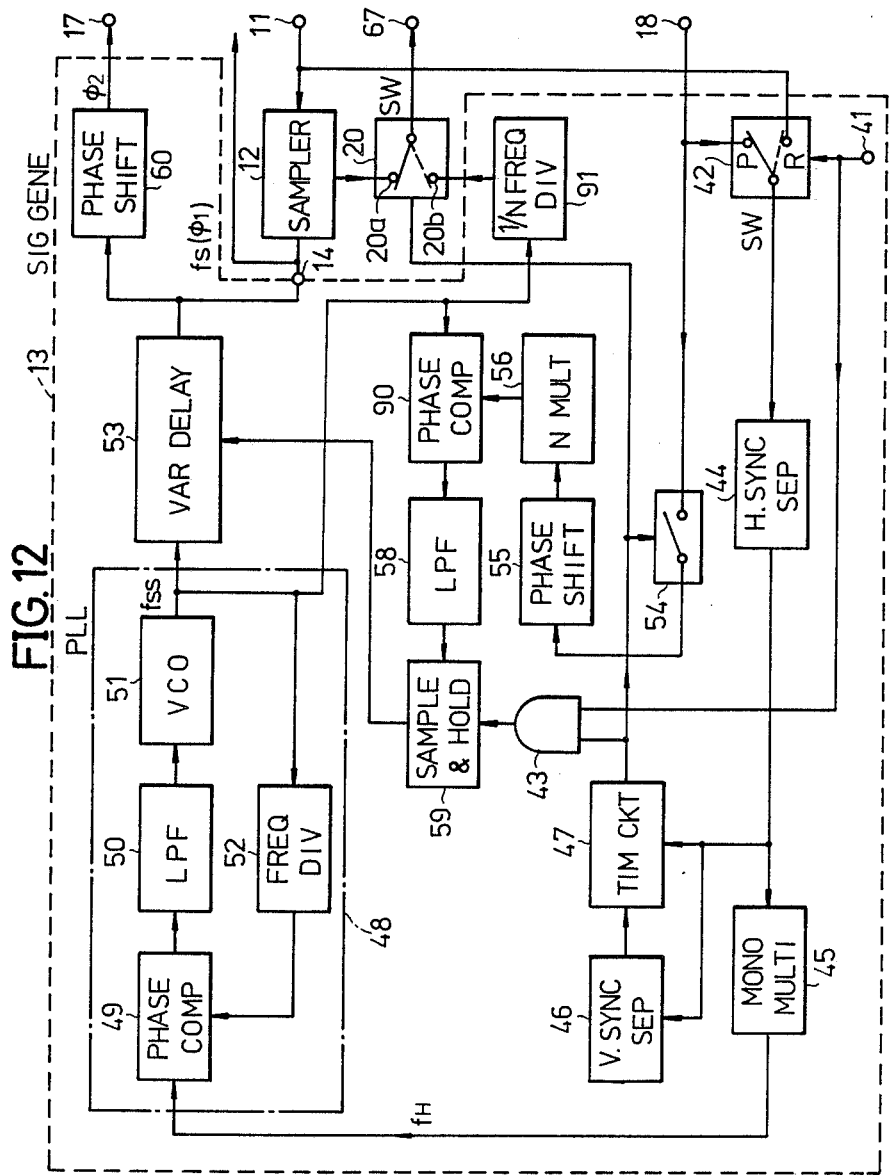
FIG. 12 is a systematic circuit diagram showing a second embodiment of the signal generator in the block system shown in FIG. 1.

Next, a description will be given with respect to a second embodiment of the signal generator 13 by referring to FIG. 12. In FIG. 12, those parts which are the same as those corresponding parts in FIG. 7 are designated by the same reference numerals, and their description will be omitted. According to the present embodiment, the variable delay circuit 53 is controlled by an open loop. In prinicple, the present embodiment is similar to the first embodiment shown in FIG. 7, however, according to the present embodiment, the delay time is controlled by an open loop in the duration in which the reference burst signal is reproduced, and moreover, the delay time is controlled by predicting an optimum delay time based on the phase error voltage. In other words, the output reference sampling pulse $f_{ss}$ of the VCO 51 is supplied to a phase comparator 90 and to a 1/N-frequency divider 91. Accordingly, the reference burst signal is obtained by frequency-dividing the reference sampling pulse $f_{ss}$ by 1/N. In addition, at the time of the reproduction, the delay time of the variable delay circuit 53 is variably controlled based on the phase error between the reference sampling pulse $f_{ss}$ and the signal which is obtained by frequency-multiplying N to a reproduced reference burst signal and has the frequency $f_s$.

Figure 13:
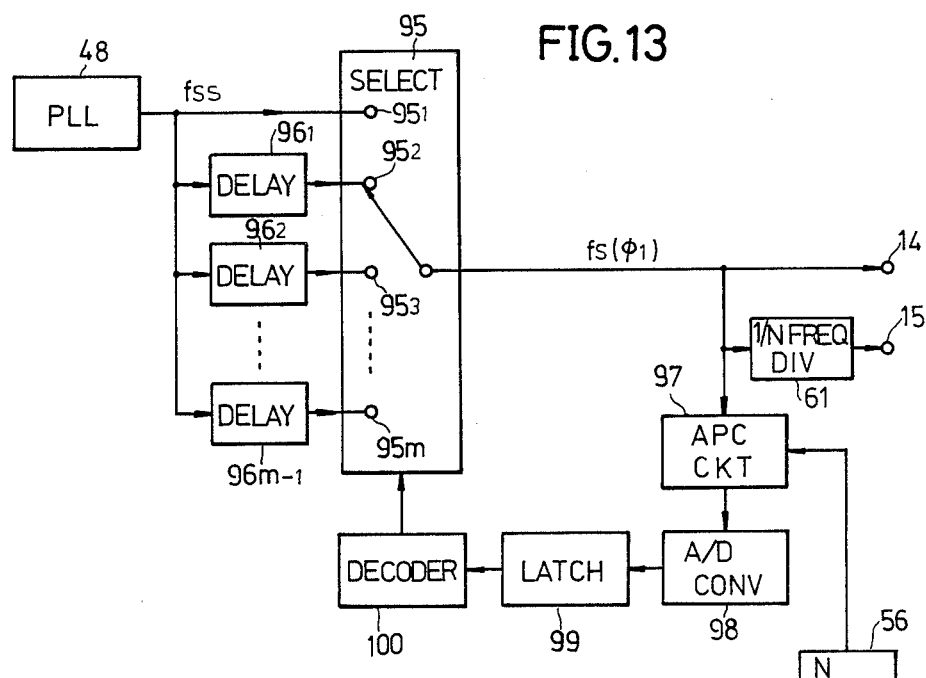
FIG. 13 is a systematic block diagram showing an embodiment of an essential part of the circuit systems shown in FIGS. 7 and 12.

FIG. 13 is a systematic block diagram showing another embodiment of an essential part of the signal generator 13. In FIG. 13, those parts which are the same as those corresponding parts in FIG. 7 are designated by the same reference numerals, and their description will be omitted. In each of the embodiments described heretofore, the delay time of the variable delay circuit 53 is controlled by analog control, however, according to the present embodiment, the delay time of the variable delay circuit 53 is controlled digitally. In FIG. 13, the output signal of the PLL 48 is supplied directly to a terminal $95_1$ of a selector 95. The output signal of the PLL 48 is also supplied to terminals $95_2$ through $95_m$ in parallel through respective delay circuits $96_1$ through $96_{m-1}$, where m is a natural number. When it is assumed that an analog-to-digital (A/D) converter 98 which will be described later has i bits, where i is a natural number, m is equal to $2^i$. Delay times of the delay circuits $96_1$ through $96_{m-1}$ are mutually different.

The output signal of the selector 95 is supplied to an automatic phase control (APC) circuit 97. The APC circuit 97 compares the phase of the output signal of the selector 95 with the phase of the output signal of the frequency multiplier 56, and eliminates an unwanted frequency component. An output signal of the APC signal 97 is supplied to the A/D converter 98. An output i-bit digital signal of the A/D converter 98 is supplied to a latch circuit 99, and is latched during the one or plurality of predetermined durations within the vertical blanking period excluding the duration of the horizontal synchronizing signal. The latched digital data from the latch circuit 99 is passed through a decoder 100 and is supplied to the selector 95. The selector 95 is connected to one of the terminal $95_1$ through $95_m$ depending on the value of the output signal of the decoder 100.

Figure 14:
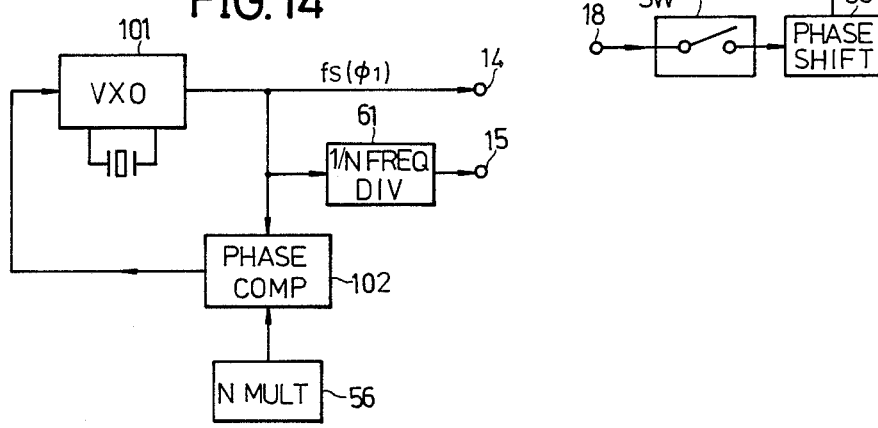
FIG. 14 is a systematic block diagram showing an embodiment of another essential part of the circuit systems shown in FIGS. 7 and 12.

FIG. 14 is a systematic block diagram showing an embodiment of another essential part of the signal generator 13. In FIG. 14, those parts which are the same as those corresponding parts in FIG. 7 are designated by the same reference numerals and their description will be omitted. In FIG. 14, a voltage controlled crystal oscillator (VXO) 101 produces a pulse train having the repetition frequency $f_s$. A phase comparator 102 compares the phase of the output pulse train of the VXO 101 and the phase of the reproduced reference burst signal from the frequency multiplier 56. The phase comparator 102 supplies an error voltage which is in accordance with the phase error to the VXO 101 as a control signal. Accordingly, the oscillation frequency of the VXO 101 is variably controlled so that the phase error in the phase comparator 102 becomes a minimum. The variable range of the VXO 101 is narrow compared to the varaible range of the PLL, and for this reason, the frequency stability of the oscillation frequency of the VXO 101 is high. Therefore, the phase of the re-sampling pulse will essentially correspond to the phase of the sampling pulse at the time of the recording.

Figure 15:
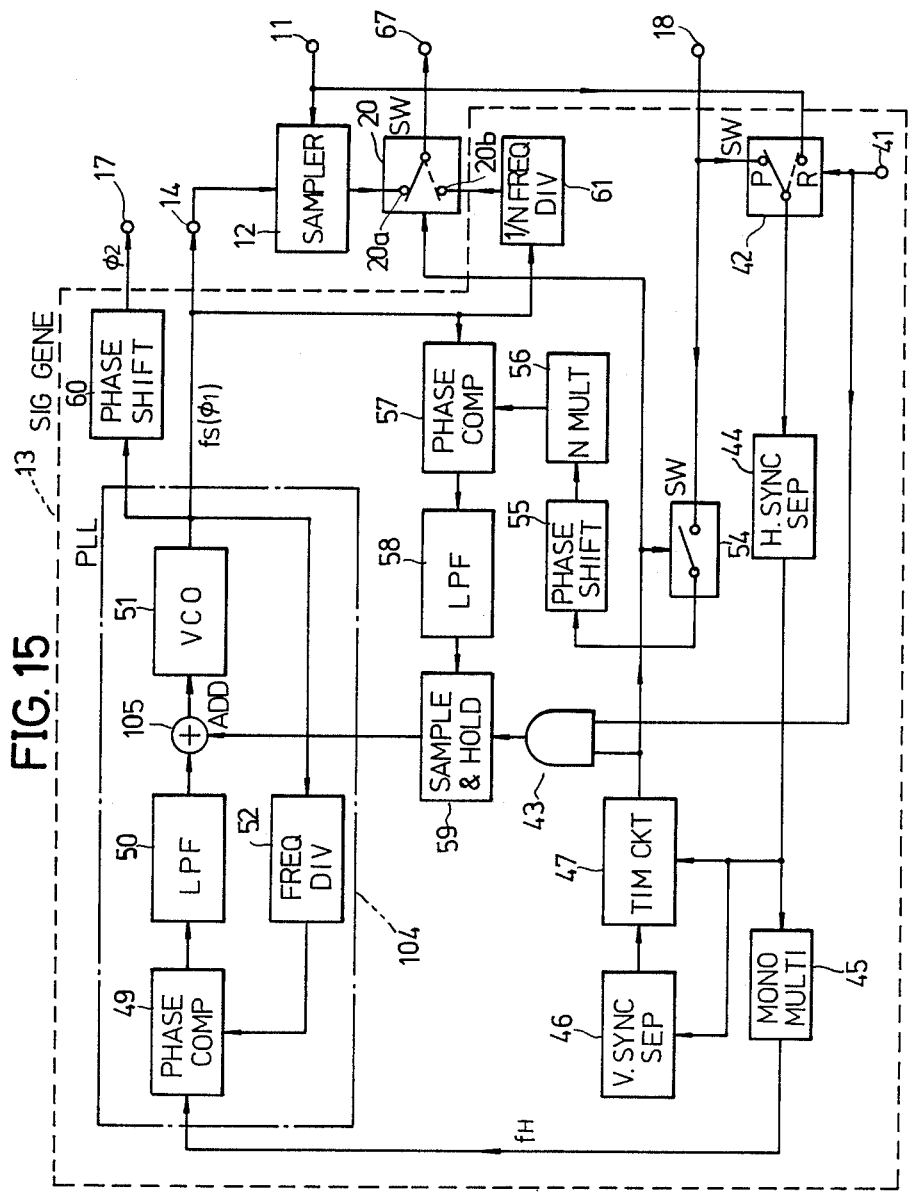
FIG. 15 is a systematic circuit diagram showing a third embodiment of the signal generator in the block system shown in FIG. 1.

Next, a description will be given with respect to a third embodiment of the signal generator 13 by referring to FIG. 15. In FIG. 15, those parts which are the same as those corresponding parts in FIG. 7 are designated by the same reference numerals, and their description will be omitted. In FIG. 15, a PLL 104 is constituted by a closed loop comprising the phase comparator 49, the lowpass filter 50, an adder 105, the VCO 51, and the frequency divider 52. In other words, an added voltage which is obtained by adding the output voltage of the lowpass filter 50 and the output voltage of the sample and hold circuit 59, is applied to the VCO 51 as a control voltage so as to variably control the oscillation frequency of the VCO 51. As described before, the output signal of the lowpass filter 58 is zero at the time of the recording, and thus, the voltage supplied to the adder 105 from the sample and hold circuit 59 is also zero.

Accordingly, the control voltage applied to the VCO 51 at the time of the recording only consists of the output voltage of the lowpass filter 50. Hence, the signal which has the frequency $f_s$ and is in phase synchronism with the horizontal synchronizing signal, is produced from the VOC 51 as the sampling pulse $\phi_1$.

On the other hand, at the time of the reproduction, the sample and hold circuit 59 produces the voltage which is obtained by sampling and holding the output error voltage of the lowpass filter 58 in the duration in which the reference burst signal is reproduced, as described before. Accordingly, the voltage which is obtained by adding the output error voltage of the lowpass filter 50 and the output voltage of the sample and hold circuit 59 in the adder 105, is applied to the VCO 51 as a control voltage. Thus, the repetition frequency $f_s$ of the sampling pulse $\phi_1$ which is obtained from the VCO 51 is variably controlled so that the phase errors in the phase comparators 49 and 57 respectively assume a minimum. According to the present embodiment, it is unnecessary to provide the variable delay circuit 53 which is required in the first and second embodiments described before, and it is possible to reduce the manufacturing cost of the apparatus as a whole.

The PLL 104 shown in FIG. 15 may be used instead of the PLL 48 shown in FIG. 13.

Figure 16:
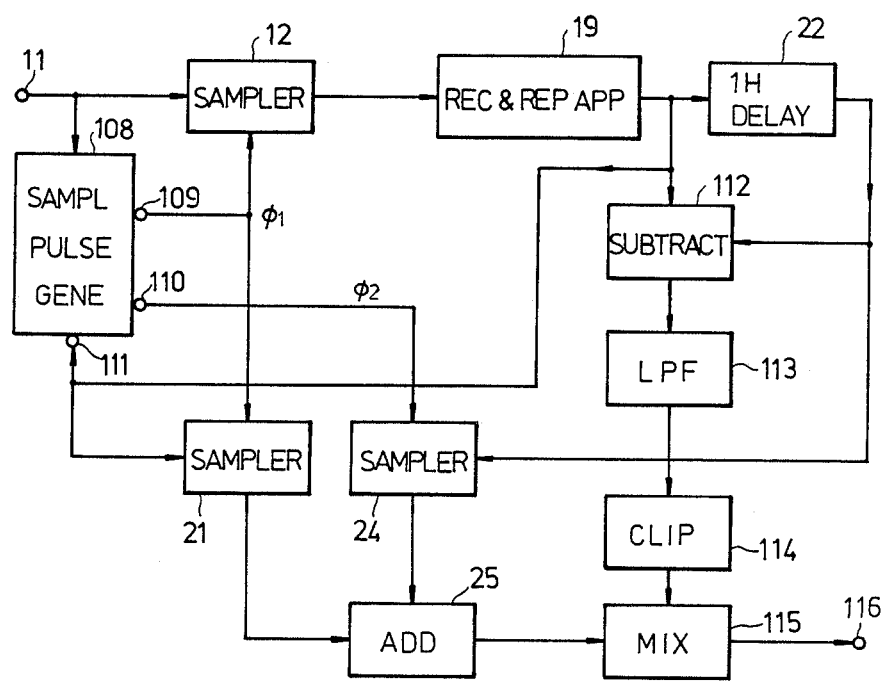
FIG. 16 is a systematic block diagram showing a second embodiment of the apparatus according to the present invention.

Next, a description will be given with respect to a second embodiment of the apparatus according to the present invention, by referring to FIGS. 16 through 20. In FIG. 16, those parts which are the same as those corresponding parts in FIG. 1 are designated by the same reference numerals, and their description will be omitted. In FIG. 16, the sampling pulse $\phi_1$ which is formed in phase synchronism with the horizontal synchronizing signal of the input video signal and has the repetition frequency $f_s$, is supplied to the sampler 12 from a terminal 109 of a sampling pulse generator 108.

Figure 17:
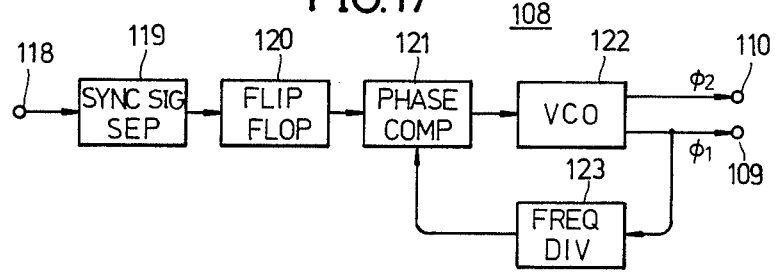
FIG. 17 is a systematic block diagram showing an embodiment of a sampling pulse generator in the block system shown in FIG. 16.

For example, the sampling pulse generator 108 has the construction shown in FIG. 17. In FIG. 17, the input video signal from the input terminal 11 is applied to an input terminal 118 at the time of the recording. At the time of the reproduction, the reproduced time division multiplexed signal from the recording and reproducing apparatus 19 is supplied to a synchronizing signal separating circuit 119 through a terminal 111 shown in FIG. 16. The horizontal synchronizing signal which is extracted from the input signal in the synchronizing signal separating circuit 119, is frequency-divided by ½ in a flip-flop 120. An output signal of the flip-flop 120 is supplied to a phase comparator 121, and is subjected to a phase comparison with an output signal of a frequency divider 123. The output signal of the frequency divider 123 has a repetition frequency of $f_H/2$. An output error voltage of the phase comparator 121, which is in accordance with the phase error, is supplied to a VCO 122 as a control voltage. The oscillation frequency of the VCO 122 is variably controlled by the output error voltage of the phase comparator 121. An output pulse of the VCO 122 is frequency-divided by $1/(2n+1)$ in the frequency divider 123, where n is a natural number, and is converted into a signal having a repetition frequency of $f_H/2$. This output signal of the frequency divider 123 is supplied to the phase comparator 121.

Accordingly, the loop comprising the phase comparator 121, the VCO 122, and the frequency divider 123, constitutes the known PLL. Thus, the pulse which is in phase synchronism with the horizontal synchronizing signal of the input video signal and has the repetition frequency $f_s$, is obtained from the VCO 122.

The output pulse $\phi_1$ of VCO 122 having the repetition frequency $f_s$, is supplied to the frequency divider 123 as described before, and is also obtained through the terminal 109 to be supplied to the sampler 12 shown in FIG. 16. The pulse $\phi_2$ which has the same repetition frequency $f_s$ as the pulse $\phi_1$ but has a phase which differs from the phase of the pulse $\phi_1$ by 180°, is produced from the VCO 122 and is obtained through a terminal 110.

The sampled signal which is recorded similarly as in the first embodiment shown in FIG. 1, is reproduced in a reproducing apparatus having a construction different from that of the first embodiment. In other words, a reproduced sampled signal from the recording and reproducing apparatus 19 is supplied to the sampling pulse generator 108, the sampler 21, the 1H delay circuit 22, and a subtracting circuit 112. The reproduced sampled signal which is delayed by 1H in the 1H delay circuit 22, is supplied to the sampler 24 and the substracting circuit 112. The sampling pulse $\phi_1$ which is in phase synchronism with the reproduced horizontal synchronizing signal and has the repetition frequency $f_s$, is obtained from the terminal 109 of the sampling pulse generator 108 and is supplied to the sampler 21. Hence, the sampler 21 samples and holds the reproduced sampled signal by the sampling pulse $\phi_1$. Similarly, the sampling pulse $\phi_2$ which is in phase synchronism with the reproduced horizontal synchronizing signal and has the repetition frequency $f_s$, is obtained from the terminal 110 of the sampling pulse generator 108 and is supplied to the sampler 24. The sampler 24 samples and holds the delayed reproduced sampled signal by the sampling pulse $\phi_2$.

The output reproduced sampled signals of the samplers 21 and 24 are added in the adder 25, and the adder 25 produces a reproduced video signal having a frequency band which is wider than the recording and reproducing frequency band of the recording and reproducing apparatus 19. The output recorded video signal of the adder 25 is obtained by re-sampling the two reproduced sampled signals having a relative time difference of 1H and then adding the two re-sampled signals. For this reason, the output reproduced video signal of the adder 25 comprises frequency components which are natural number multiples of the horizontal scanning frequency $f_H$, and the vertical resolution is deteriorated by ½. Thus, according to the present embodiment, the frequency components which are natural number multiples of ½ the horizontal scanning frequency $f_H$ are also obtained through an outupt terminal 116 for the low-frequency components which mainly determine the vertical resolution, so as to compensate for the above described deterioration in the vertical resolution. Therefore, the subtracting circuit 122 performs a subtraction between the two reproduced sampled signals having the relative time difference of 1H, and supplies to a lowpass filter 113 a signal comprising frequency compoents which are natural number multiples of ½ the horizontal scanning frequency $f_H$. The output low-frequency components of the lowpass filter 113 are supplied to a clipping circuit 114 which constitutes an essential part of the present embodiment. An intermediate part of the output signal waveform of the lowpass filter 113 having an amplitude smaller than a predetermined clipping level, is eliminated in the clipping circuit 114. An output signal of the clipping circuit 114 is supplied to a mixing circuit 115 and is mixed with the output signal of the adder 25. An output reproduced video signal of the mixing circuit 115 is produced through the output terminal 116.

Figure 18A:
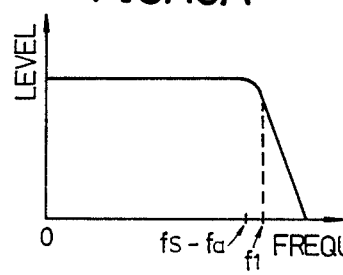
FIGS. 18A and 18B respectively show examples of a frequency characteristic of a lowpass filter in the block system shown in FIG. 16 and a general frequency characteristic of a reproducing apparatus which is not provided with a clipping circuit.
Figure 18B:
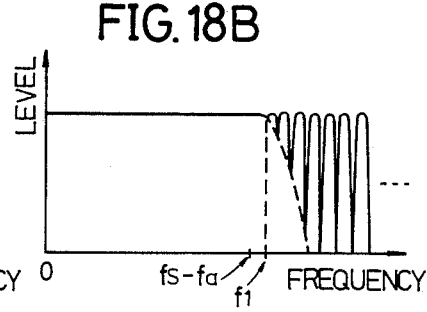

Generally, it is difficult to design a lowpass filter which has a amplitude versus frequency characteristic with a sharp sloping part, and also has a superior phase versus frequency characteristic. For this reason, it is difficult to select the cutoff frequency of the lowpass filter 113 so that both the amplitude versus frequency characteristic and the phase versus frequency characteristic of the lowpass filter 113 are satisfactory. In other words, in a case where the clipping circuit 114 is not provided in the reproducing system, for example, the general frequency characteristic of the reproducing system becmes as shown in FIG. 18B when the frequency characteristic (amplitude versus frequency characteristic) of the lowpass filter 113 is set as shown in FIG. 18A wherein a cutoff frequency $f_1$ is slightly higher than the frequency $f_s - f_a$. In FIGS. 18A and 18B, $f_s$ represents the sampling frequency and $f_a$ represents the upper limit frequency of the input video signal. In the frequency characteristic shown in FIG. 18B, the characteristic is flat in the low-frequency range under the frequency $f_1$, and the characteristic is a comb filter characteristic in the high-frequency range over the frequency $f_1$. In other words, in the high-frequency range of the frequency $f_1$ in the charactertistic shown in FIG. 18B, the center frequencies of the pass bands are even number multiples of $f_H/2$, and the center frequencies of the attenuation bands are odd number multiples of $f_H/2$. However, as described before in conjunction with FIG. 2(D), the aliasing components are included within the high-frequency components of the reproduced sampled signal over the frequency $f_s - f_a$. Thus, some of the aliasing components pas through the lowpass filter 113, and introduces aliasing noise which deteriorates the quality of the reproduced picture.

Figure 19A:
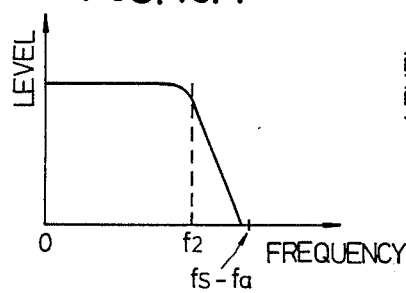
FIGS. 19A and 19B respectvely show other examples of a frequency characteristic of the lowpass filter in the block system shown in FIG. 16 and a general frequency characteristic of the reproducing apparatus which is not provided with a clipping circuit.
Figure 19B:
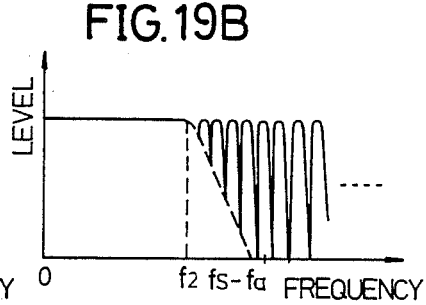
Figure 20:
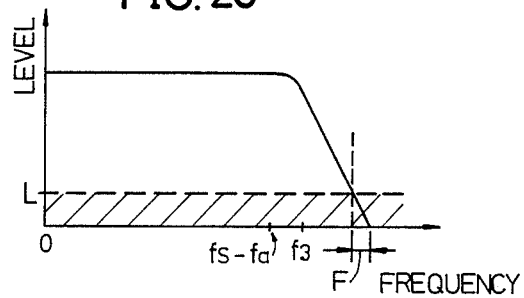
FIG. 20 is a graph for explaining the relationship between the frequency characteristic of the lowpass filter in the block system shown in FIG. 16 and the wave eliminating operation of the clipping circuit.

On the other hand, in a case where the frequency characteristic of the lowpass filter 113 is set as shown in FIG. 19A wherein a cutoff frequency $f_2$ is slightly lower than the frequency $f_s - f_a$, the generaly frequency characteristic of the reproducing system becomes as shown in FIG. 19B. According to the frequency characteristic shown in FIG. 19B, a comb filtter characteristic similar to the comb filter characteristic shown in FIG. 18B is obtained in the high-frequency range over the frequency $f_2$ including the frequency $f_s - f_a$, and thus, the aliasing noise described before can be reduced considerably. However, in this case, the comb filter characteristic is also obtained in a part of the low-frequency range which mainly determines the vertical resolution. Hence, the deterioration in the vertical resolution will be conspicuous at parts of the picture that are detailed, and detailed characters or the like will be blurred in the picture.

Accordingly, in the present embodiment, the clipping circuit 114 is provided between the lowpass filter 113 and the mixing circuit 115. The clipping circuit 114 eliminates a signal part (a small amplitude part in a vicinity of the center level of the input signal) having a peak-to-peak level which is less than or equal to a clipping level L, and passes a signal part having a peak-to-peak level larger than the clipping level L. Accordingly, in a case where the reproduced sampled signal from the recording and reproducing apparatus 19 has a small amplitude which is less than or equal to the clipping level L, no signal is produced from the clipping circuit 114. In this case, the reproduced video signal produced through the output terminal 116 comprises the frequency components which are obtained from the adder 25 and are even number multiples of $f_H/2$. This reproduced video signal produced through the output terminal 116 has a wide frequency band, and is eliminated f the aliasing components existing in the high-frequency range over the frequency $f_s - f_a$.

On the other hand, in a case where the reproduced sampled signal from the recording and reproducing apparatus 19 has a large amplitude which is greater than the clipping level L, a signal comprising the frequency components which are odd number multiples of $f_H/2$, are under a cutoff frequency $f_3$ of the lowpass filter 113, and have an amplitude greater than the clipping level L, is produced from the clipping circuit 114. In this case, the general frequency characteristic of the reproducing system becomes similar to the frequency characteristic shown in FIGS. 18B and 19B. As described before, the aliasing components existing in the frequency range over the frequency $f_s - f_a$ are eliminated with respect to the reproduced sampled signal having the small amplitude. Thus, the cutoff frequency $f_3$ of the lowpass filter 113 can be selected to a frequency which is slightly higher than the frequency $f_s - f_a$. As a result, according to the present embodiment, the vertical resolution can be improved in a wider low-frequency range. In addition, among the small amplitude part under the clipping level L which is indicated by a phantom line in FIG. 20, it is possible to eliminate the aliasing components which are under the clipping level L and exist in a high-frequency range represented by F. Therefore, it is possible to greatly reduce the aliasing noise according to the present embodiment. According to experiments conducted by the present inventor, it was found that the clipping level L may be an extremely small value, and that the deterioration in the vertical resolution in the low-frequency range is accordingly negligible.

Figure 21:
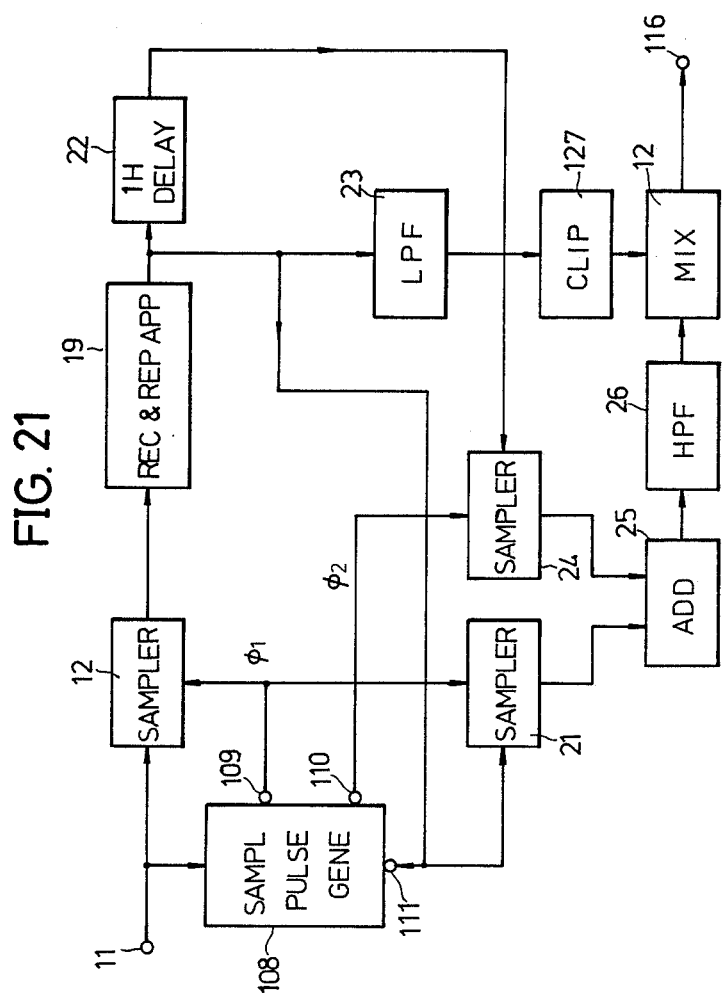
FIG. 21 is a systematic block diagram showing a third embodiment of the apparatus according to the present invention.

Next, a description will be given with respect to a third embodiment of the apparatus according to the present invention by referring to FIG. 21. In FIG. 21, those parts which are the same as those corresponding parts in FIG. 1 are designated by the same reference numerals, and their description will be omitted. In FIG. 21, the reproduced sampled signal obtained from the recording and reproducing apparatus 19 is passes through the lowpass filter 23 and is supplied to a clipping circuit 127. The clipping circuit 127 eliminates a small amplitude part including the center level of the signal supplied thereto which is lower than a clipping level. On the other hand, the clipping circuit 127 passes a remaining large amplitude part as it is and supplies the large amplitude part to a mixing circuit 128. The output re-sample signal of the adder 25 is supplied to the highpass filter 26 wherein the high-frequency components over the frequency in the range of $f_s - f_a$ are frequency-selected, and the frequency selected high-frequency components are supplied to the mixing circuit 128. The mixing circuit 128 mixes the output signals of the clipping circuit 127 and the highpass filter 26, and produces a reproduced video signal having a wide frequency band. The output reproduced video signal of the mixing circuit 128 is obtained through the output terminal 116.

According to the present embodiment, the clipping circuit 127 blocks the high-frequency components which are in the passing frequency band of the lowpass filter 23 and have a low level, as in the case of the second embodiment described beofre, even when the cutoff frequency of the lowpass filter 23 is slightly higher than the frequency $f_s - f_a$. Hence, it is possible to reduce the aliasing noise without deteriorating the vertical resolution. Further, since the clipping level is extremely low as in the case of the second embodiment, the general frequency characteristic of the reproducing system of the present embodiment becomes similar to that of the second embodiment. In other words, the general frequency characteristic of the reproducing system is a comb filter characteristic in the high-frequency range over the cutoff frequency of the lowpass filter 23, and is a flat characteristic in the low-frequency range under the cutoff frequency of the lowpass filter 23.

The present invention is not limited to the embodiments described heretofore, and for example, the circuit part comprising the highpass filter 26, the mixing circuit 27, and the lowpass filter 23 may be omitted, although the vertical resolution of the reproduced video signal will be slightly deteriorated in this case. In this case, the reproduced video signal is obtained directly from the adder 25. In addition, since the two reproduced sampled signals added in the adder 25 simply need to have a relative time difference of 1H, it is possible to provide a first delay circuit having a delay time kH at the input side of the sampler 21 and provide a second delay circuit having a delay time (k+1)H at the input side of the sampler 24 instead of the 1H delay circuit 22, where k is an arbitrary natural number. Moreover, because the variable delay circuit 53 essentially performs a phase compensation, a phase shifter may be used instead of the variable delay circuit 53 The output signal frequency of the variable delay circuit 53 may be equal to $2f_s$, for example, and in this case, the sampling pulses $\phi_1$ and $\phi_2$ having the frequence $f_a$ and having a desired duty cycle may be formed by frequency-dividing the output signal of the variable delay circuit 53. Since the sampling pulse at the time of the recording is passed through the variable delay circuit 53 having the fixed delay time, it may be readily understood that at the time of the recording the output signal of the PLL 48 can be used as it is without passing this signal through the variable delay circuit 53.

The present invention may also be applied to a recording apparatus only comprising the recording system. Further, since recording and reproduction are a form of a signal transmission, the recording system may be understood as being equivalent to a signal transmission system and the reproducing system may be understood as being equivalent to a signal receiving system. Therefore, the present invention may also be applied to such signal transmission system and signal receiving system.

In each of the embodiments shown in FIGS. 16 through 21, it is possible to add the recording and reproducing system for the reference burst signal as in the embodiment described in conjunction with FIG. 1.

Further, the present invention is not limited to these embodiments, but various variations and modifications may be made without departing from the scope of the present invention.

What is claimed is:
1. A video signal recording and reproducing apparatus comprising:
   sampling means for sampling an input video signal such as a luminance signal by a signal having a frequency $f_s$, said frequency $f_s$ being lower than twice an upper limit frequency of said input video signal and being higher than the upper limit frequency, said frequency $f_s$ being described by an equation $f_s = (\frac{1}{2}) \cdot (2n+1) \cdot f_H$, where n is a natural number and $f_H$ represents a horizontal scanning frequency of said input video signal;
   multiplexed signal obtaining means for obtaining a multiplexed signal by multiplexing a reference burst signal to an output sampled signal of said sampling means for every predetermined time period, said reference burst signal being obtained by frequency-dividing said signal having the frequency $f_s$;
   recording means for recording the output multiplexed signal of said multiplexed signal obtaining means on a recording medium;
   reproducing means for reproducing the recorded multiplexed signal from said recording medium;
   reproduced sampled signal obtaining means comprising a delay circuit for obtaining from the output reproduced multiplexed signal of said reproducing means first and second reproduced sampled signals having a relative time difference of one horizontal scanning period;
   sampling pulse generating means for generating first and second sampling pulses having the frequency $f_s$ and having phases which mutually differ by 180° in phase synchronism with said reference burst signal which is separated from the output reproduced multiplexed signal of said reproducing means;
   re-sampling means for obtaining a first re-sampled signal by re-sampling said first reproduced sampled signal by said first sampling pulse and for obtaining a second re-sampled signal by re-sampling said second reproduced sampled signal by said second sampling pulse; and
   reproduced video signal producing means for at least adding the output first and second re-sampled signals of said re-sampling means so as to produce a reproduced video signal which is essentially sampled at a frequency $2f_s$, said sampling pulse generating means comprising a pulse generating circuit for generating a pulse having the frequency $f_s$ in phase synchronism with the horizontal synchronizing signal between the horizontal and vertical synchronizing signals which are separated from the output reproduced multiplexed signal of said reproducing means, a circuit for separating said reference burst signal from the reproduced multiplexed signal, a sampling pulse generating circuit supplied with the separated horizontal and vertical synchronizing signals for generating a sampling pulse in correspondence with the phase of the separated reference burst signal, a variable delay circuit for delaying the output pulse of said pulse generating circuit by a delay time responsive to a control signal so as to produce said first sampling pulse having the frequency $f_s$, delay time control means for comparing the phase of a signal which is obtained by at least frequency-multiplying the separated reference burst signal with the phase of the output pulse of said pulse generating circuit having the frequency $f_s$ and for obtaining a phase error signal, said delay time control means supplying a signal obtained by sampling and holding the phase error signal by the output sampling pulse of said sampling pulse generating circuit to said variable delay circuit as said control signal so that said first sampling pulse produced from said variable delay circuit has a phase in correspondence with the phase of said signal having the frequency $f_s$ at the time of the recording, and means for shifting the phase of the output first sampling pulse of said variable delay circuit by 180° so as to obtain said second sampling pulse.

2. A video signal recording apparatus as claimed in claim 1 in which said multiplexed signal obtaining means comprises a separating circuit for separating horizontal and vertical synchronizing signals from said input video signal, a signal generating circuit for generating a signal which is in phase synchronism with the separated horizontal synchronizing signal from said separating circuit and has the frequency $f_s$, a frequency dividing circuit for frequency-dividing the output signal of said signal generating circuit, and multiplexing means for multiplexing an output signal of said frequency dividing circuit as said reference burst signal to said sampled signal for every predetermined duration within a vertical blanking period of said input video signal excluding a duration of the horizontal synchronizing signal.

3. A video signal recording apparatus as claimed in claim 2 in which said frequency dividing circuit frequency-divides the output signal of said signal generating circuit by 1/N, where N is a natural number.

4. A video signal recording apparatus as claimed in claim 2 in which said multiplxing means comprises a timing circuit supplied with the separated horizontal and vertical synchronizing signals for generating a pulse for every predetermined duration within the vertical blanking period of said input video signal excluding the duration of the horizontal synchronizing signal, and a switching circuit applied with the output pulse of said timing circuit as a switching signal for selectively passing the output signal of said frequency dividing circuit as said reference burst signal during said predetermined duration and for selectively passing the output sampled signal of said sampling means in durations other than said predetermined duration so as to produce a time division multiplexed signal comprising said reference burst signal and said sampled signal.

5. A video signal recording and reproducing apparatus as claimed in claim 1 in which said reproduced video signal producing means comprises an adder for adding said first and second re-sampled signals, a first filter circuit supplied with an output signal of said adder for filtering a high-frequency component higher than a first cutoff frequency, a second filter circuit supplied with the output reproduced multiplexed signal of said reproducing means for filtering a low-frequency component lower than a second cutoff frequency which is approximately equal to said first cutoff frequency, and a mixing circuit for mixing output signals of said first and second filter circuits so as to produce the reproduced video signal.

6. A video signal recording and reproducing apparatus as claimed in claim 1 in which said reproduced video signal producing means comprises an adder for at least adding the output first and second re-sampled signals of said re-sampling means so as to obtain a signal which is essentially sampled at a frequency $2f_s$; a subtracting circuit for performing a subtraction between said first and second re-sampled signals; filtering and clipping means supplied with an output signal of said subtracting circuit for only passing a signal part which is in a low-frequency range under a predetermined frequency and has an amplitude greater than a predetermined clipping level; and a mixing circuit for mixing output signals of said adder and said filtering and clipping means and for producing the reproduced video signal.

7. A video signal recording and reproducing apparatus as claimed in claim 1 in which said reproduced video signal producing means comprises an adder for at least adding the output first and second re-sampled signals of said re-sampling means so as to obtain a signal which is essentially sampled at a frequency $2f_s$; filtering and clipping means supplied with said first reproduced sampled signal for only passing a signal part which is in a low-frequency range under a first frequency and has an amplitude greater than a predetermined clipping level; a filter circuit supplied with an output signal of said adder for filtering a signal part in a high-frequency range over a second frequency which is approximately equal to said first frequency; and a mixing circuit for mixing output signals of said filtering and clipping means and said filter circuit and for producing the reproduced video signal.

* * * * *